(12) United States Patent
Tibbits

(10) Patent No.: US 6,945,699 B2
(45) Date of Patent: Sep. 20, 2005

(54) BEARING HAVING ANODIC NANOPARTICLE LUBRICANT

(75) Inventor: Patrick Tibbits, Valparaiso, IN (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 91 days.

(21) Appl. No.: 10/620,985

(22) Filed: Jul. 16, 2003

(65) Prior Publication Data

US 2005/0180671 A1 Aug. 18, 2005

(51) Int. Cl.[7] .......................... F16C 33/66; F16C 33/62
(52) U.S. Cl. ..................................... 384/462; 384/492
(58) Field of Search ............................... 384/462, 492, 384/490, 548, 912, 913

(56) References Cited

U.S. PATENT DOCUMENTS

| | | |
|---|---|---|
| 1,913,953 A | 6/1933 | Prendergast et al. |
| 4,289,631 A | 9/1981 | Luxemburg |
| 4,363,737 A | 12/1982 | Rodriguez |
| 5,352,046 A | 10/1994 | Ward |
| 5,716,147 A | 2/1998 | Cook et al. |
| RE35,860 E | 7/1998 | Ward |
| 6,062,735 A | 5/2000 | Ward |
| 6,318,898 B1 | 11/2001 | Ward et al. |
| 6,613,721 B1 | 9/2003 | Kernizan et al. |
| 6,652,148 B2 * | 11/2003 | Iso et al. ..................... 384/462 |
| 6,710,020 B2 * | 3/2004 | Tenne et al. ................. 508/103 |
| 6,764,219 B2 * | 7/2004 | Doll et al. ................... 384/565 |
| 2002/0019319 A1 | 2/2002 | Denpo et al. |

FOREIGN PATENT DOCUMENTS

| | | |
|---|---|---|
| DE | 4131516 A1 | 4/1993 |
| DE | 10009997 A1 | 9/2001 |
| JP | 2003028174 | 1/2003 |

OTHER PUBLICATIONS

Qiu et al., "Preparation of Ni Nanoparticles and Evaluation of Their Tribological Performance as Potential Additives in Oils," *Journal of Tribology*, 123:441-443. (Jul. 2001).

Chinas-Castillo et al., "The Behavior of Colloidal Solid Particles in Elastohydrodynamic Contacts©," *Tribology Transactions*, 43:387-394 (2000).

Abstract of Hanada et al. "Characterization of diamond nanoclusters and applications to self-lubricating composites," *New Diamond and Frontier Carbon Technology*, pp. 133-142.

Chinas-Castillo et al. "Mechanism of Action of Colloidal Solid Dispersions," Transactions of the ASME, 125:552-557 (Jul. 2003).

PCT International Search Report for related application No. PCT/US2004/022740, mailed Apr. 11, 2005.

\* cited by examiner

*Primary Examiner*—Thomas R. Hannon
(74) *Attorney, Agent, or Firm*—McDonnell Boehnen Hulbert & Berghoff LLP

(57) ABSTRACT

A bearing with lubricant having metal or metal alloy nanoparticles that are more anodic than the metal or metal alloy of which the inner or outer raceways of the bearing are constructed; and method for using the same.

49 Claims, 3 Drawing Sheets

BEARING HAVING ANODIC NANOPARTICLE LUBRICANT

FIELD OF INVENTION

The present invention is directed generally to lubricants, and more particularly to lubricants used in rolling contacts, such as in ball and roller bearings.

BACKGROUND OF THE INVENTION

In many applications, bearings encounter hostile, corrosive operating environments and high repetition use. Corrosion, rolling contact fatigue, and loss of lubricant may reduce bearing life. Corrosion of steel in bearings may result in high maintenance costs and equipment down time while costly repairs or replacements are made. The high repetition inherent in bearing use causes fatigue in the bearing elements and the raceways. Additionally, in use, lubricant escapes from bearings, resulting in frequent maintenance and possible equipment downtime while lubricant is reapplied. It is thus desirable to have an invention that protects against corrosion, promotes long fatigue life, and can be applied to machine elements with minimum equipment downtime.

One known method of corrosion protection is to cover a material with a protective coating to physically separate the material from exposure to a potentially corrosive environment. For example, methods have been taught to combat corrosion through the application of a zinc plating to raceway and roller bearing surfaces. As disclosed in U.S. Pat. No. 5,352,046, for example, zinc or zinc alloy plated layers are applied to contact surfaces by an electroplating process. This electroplating process is disadvantageous, however, because it adds expense and time to the manufacturing process. Corrosion protection of bearings and raceways has also been attempted through multilayer plating and protection systems, as disclosed in U.S. Pat. No. 6,062,735, for example. Disadvantageously, the application of these multiple layers requires even more time and manufacturing expense than the application of a single plated layer of zinc or zinc alloy. In addition, neither U.S. Pat. No. 5,352,046 nor U.S. Pat. No. 6,062,735 discloses protection that can be readily applied or retrofitted to bearings already in use.

Another method of corrosion protection is anodic protection. Anodic protection involves the use of a more anodic, or active, metal to coat and protect a metal that is less anodic. In some applications, one advantage of anodic protection is that breaks or scratches in the more anodic metal coating do not cause the underlying less anodic metal to corrode.

The term anodic metal refers to the tendency of dissimilar materials to ionize or corrode. The relative corrosive tendencies of many dissimilar metals and metal alloys are predictable and have been tabulated in what is commonly known as a galvanic series, an example of which can be found at ASTM G82-98.

Metals and metal alloys are arranged in the galvanic series from least anodic to most anodic. When dissimilar metals or metal alloys are coupled such that electrons can flow between them, electrons will flow from the more anodic metal or metal alloy to the less anodic metal or metal alloy. This electron flow is accompanied by ionization of the more anodic metal or metal alloy that leads to corrosion of the more anodic metal or metal alloy. Consequently, the more anodic metal or metal alloy can corrode but the underlying, less anodic material does not.

Other inventions have sought to increase lubricant retention through the use of solid lubricants or metal-containing pastes. However, as disclosed in U.S. Pat. No. 4,363,737, for example, these pastes do not provide anodic protection against corrosion. This patent also ignores the necessity to entrain soft solid metal particles in a lubricated contact in order to form transfer films on the contacting bodies. The patent recommends a metal particle content of at least thirty-five percent by weight, and does not specify the size of the metal particles in the paste. Both particle size and concentration strongly affect entrainment of particles. In addition, Qiu, "Preparation of Ni Nanoparticles and Evaluation of Their Tribological Performance As Potential Additives in Oils," discloses the use of Nickel nanoparticles as additives in lubricating oils to improve their load bearing capacity and friction and wear characteristics. Qiu does not, however, disclose the use of nanoparticles to provide anodic protection against corrosion.

Accordingly, there is a need for a lubricant for bearings and other machine elements that provides anodic protection against corrosion. In addition, there is a need to provide a lubricant for bearings and other machine parts that provides a soft coating on bearing raceways to improve rolling contact fatigue life. There is also a need to provide a lubricant for bearings and other machine elements that is easy to apply to bearings that are already in use.

SUMMARY OF THE INVENTION

In accordance with these goals, the present embodiments provide a bearing lubricant that includes metal or metal alloy nanoparticles that are more anodic than the metal or metal alloy of which the inner and outer raceways of the bearing are constructed. In addition, the present embodiments provide a lubricant for bearings and other machine parts that provides a soft coating on bearing raceways to improve rolling contact fatigue life. The lubricant is easy to apply to bearings that are already in use and may replace corroded anodic metal or metal alloy coating within the bearing. Although, particularly useful in the field of bearings the lubricant and lubricant films or coatings with suspended nanoparticles described herein may also be useful in other applications, particularly in any environment where there is rolling or sliding contact between contacting pieces.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figures 1A, 1B:
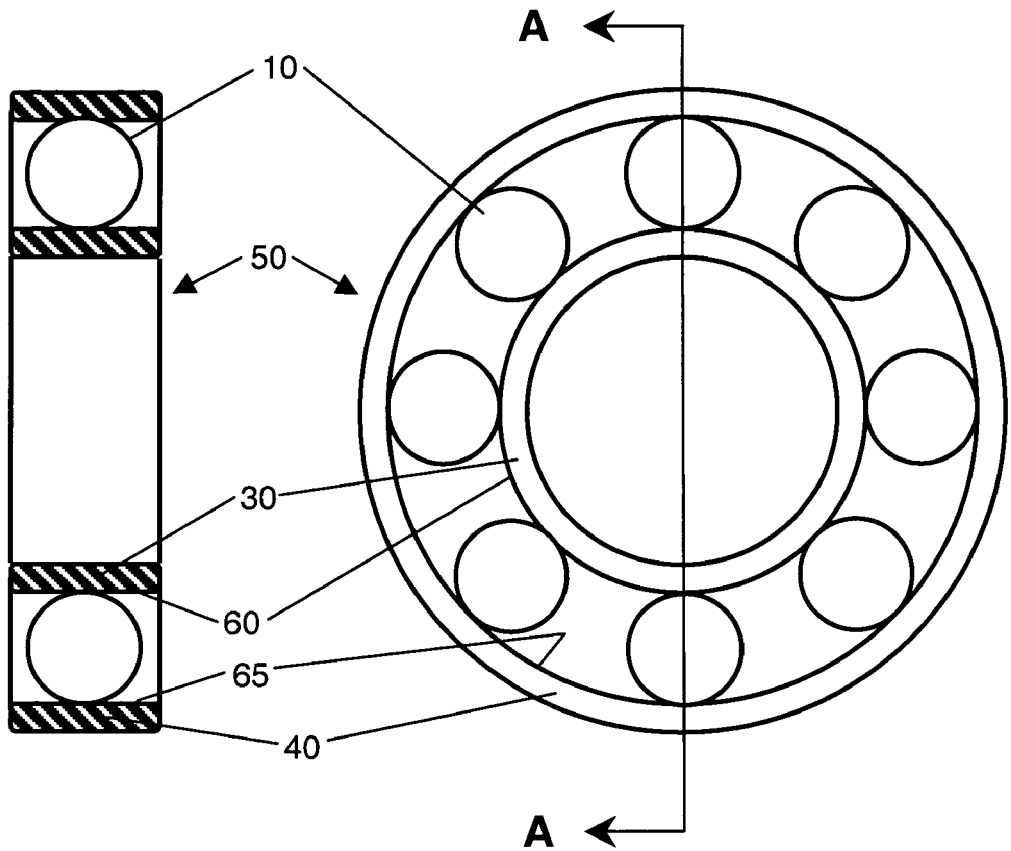
FIG. 1A is a cross-sectional view of a bearing element with an inner and outer ring, raceways, and a plurality of roller elements.
FIG. 1B is a cross-sectional view of a bearing element with an inner and outer ring, raceways, and a plurality of roller elements.

While the invention is susceptible to various modifications and alternative forms, specific embodiments thereof are shown by way of example in the drawings and will herein be described in detail. It should be specifically understood with respect to the drawings that the drawings are of preferred alternate embodiments, and there are many other embodiments and forms in which the present invention may appear. It should also be understood that the drawings and detailed description thereof are not intended to limit the invention to the particular form disclosed, but on the contrary, the invention is to cover all modifications, equivalents, and alternatives falling within the spirit and scope of the present invention or within the scope of the appended claims.

The invention could benefit operation of any device in which interacting surfaces allow formation of a partial or complete surface film from the nanoparticles suspended in the lubricant.

In addition, while the present invention is particularly useful in harsh operating condition applications, the present invention may be used for any other application where the use of anodic metal or metal alloy nanoparticles would be suitable.

DETAILED DESCRIPTION OF THE PREFERRED EMBODIMENT

FIG. 1A depicts a cross-sectional view of a bearing element 50, and FIG. 1B depicts a cross-sectional view of the bearing of FIG. 1A taken along the line A—A. As shown in FIGS. 1A and 1B, a typical bearing element 50 comprises an inner ring 30 and an outer ring 40. The inner ring 30 and outer ring 40 are typically made from hardened steel, but other materials such as stainless steel, plastics, and ceramics can also be used, especially in corrosive environments. In FIGS. 1A and 1B, inner ring 30 and outer ring 40 include inner raceway 60 and outer raceway 65, contain or partially contain roller elements 10, and provide a surface upon which roller elements 10 travel during use. The raceway of the inner ring can be made of the same material as the raceway of the outer ring, or they can be made of different materials. The use of the term "first metal or metal alloy" and "second metal or metal alloy" as used herein covers both. Thus, the first metal or metal alloy may be either the same as or different from the second metal or metal alloy. Roller elements 10 can be any type of rolling element used in a bearing, including but not limited to any type of ball, roller, needle, or thrust bearing. In a typical application, a plurality of roller elements 10 are arranged in a bearing element 50 that supports or aligns rotating shafts or other machine elements.

Figure 2:
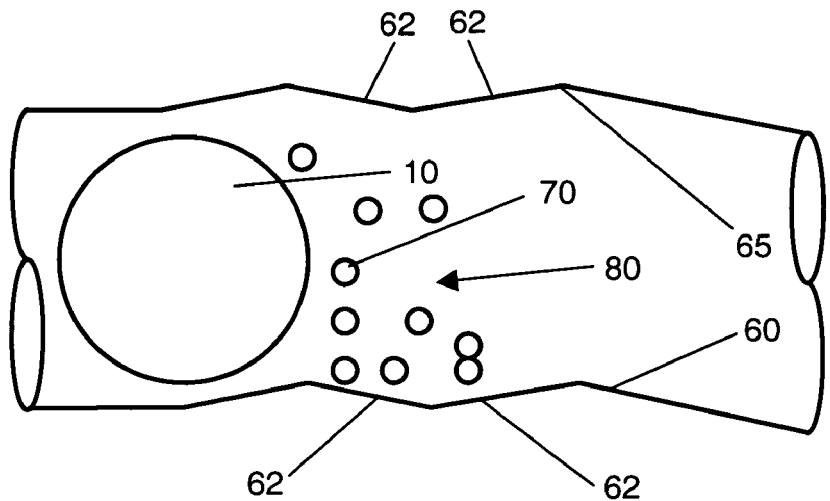
FIG. 2 is a magnified side view of a section of a bearing element with a roller element, raceways, and suspended anodic metal or metal alloy nanoparticles.

FIG. 2 depicts a magnified side view of a section of a bearing element 50. As shown in FIG. 2, a roller element 10 is in communication with inner raceway 60 and outer raceway 65. FIG. 2 also shows a magnified view of the imperfections 62 on the surface of raceways 60 and 65. Anodic metal or metal alloy nanoparticles 70 are shown suspended in a lubricant 80 (filling the area between the raceways 60 and 65).

The lubricant 80 including suspended anodic metal or metal alloy nanoparticles 70 partially fills the areas between the roller elements 10 and the raceways 60 and 65. The lubricant 80 would ideally be a grease or extreme pressure grease suitable for use in hostile conditions, such as Shell Albania EP2 Grease, to which anodic metal or metal alloy nanoparticles 70 are added. The use of other lubricants such as lubricating oils, pastes, or other fluids or solids is also contemplated by the present invention.

Because the anodic metal or metal alloy nanoparticles 70 are suspended in a lubricant 80, the present invention is particularly suited for use in existing bearings or even bearings that are already in operation. As with known methods of lubrication of operational bearing elements, the lubricant 80 including suspended anodic metal or metal alloy nanoparticles 70 can be injected into a bearing through conventional grease fittings, with which bearings are typically equipped. Thus, one advantage of the present invention over the prior art is apparent. Prior art systems for corrosion protection, such as electroplating a zinc-nickel layer on raceways as disclosed in U.S. Pat. No. 5,352,046, require the application of a zinc plated layer during the bearing manufacturing process. Further it is uneconomical and prohibitively expensive to electroplate a zinc-nickel layer on the raceways of existing bearings. It is necessary to remove that bearing from use and carefully clean the surface to be plated. This requires expensive machine downtime and labor.

One embodiment of the present invention contemplates that bearings will be lubricated with the anodic lubricant at the time of manufacture. Furthermore, unlike zinc-plated bearings, the anodic lubricant may also be applied to existing bearings and even bearings in operation by simply packing the bearings with the anodic lubricant.

As shown in FIG. 2, nanoparticles 70 have a generally spherical shape, but nanoparticles 70 having any shape befitting the spirit of the invention is contemplated. In general, a size and shape that facilitates distribution of the nanoparticles 70 in the lubricant 80 is most desirable. The nanoparticle concentration is preferably between 0.2% and 2%. It is most preferable to use nanoparticles 70 with concentrations from 0.2% to 0.5% in a lubricant 80. However, it would also be possible to obtain the advantages of the inventions using concentrations of nanoparticles from 2% to 7%. As used herein, all references to concentrations and percentages refer to percentage of concentration measured by weight. Preferably, the average size of nanoparticles 70, while suspended in lubricant 80, is approximately 10 nm in diameter, but larger nanoparticles might be used. The entrainment of a particle into a contact between two cylinders, such as the roller and raceway of a roller bearing depends on the radii of the roller, R, and raceway, ri, as well as on the friction coefficient, $\mu$, according to the equation $$R_{max} = \{[(r_i+R)^2 + 4\mu^2 R r_i]^{1/2} - (r_i+R)\}/2$$

Where $R_{max}$ denotes the radius of the largest particle that the contact can entrain.

As an example, a roller bearing having roller radius R=0.0315 inches, inner race radius $r_i$=0.29135 inches, and coefficient of friction between particle and race and between particle and roller $\mu$=0.01, could entrain a particle of $R_{max}$=70 microns, or 140 microns in diameter. Where a higher coefficient of friction exists, the roller/race contact could entrain larger particles in the thin film of lubricant.

In common use and as used herein, the term nanoparticle refers to a particle 50 nm or less in size, measured in any direction. Nanoparticles are manufactured by companies such as Aveka Group of Woodbury, Minn.

In an exemplary embodiment, nanoparticles 70 are anodic relative to the material comprising the raceways 60 and 65. Preferably, zinc or zinc alloy nanoparticles 70 can be used, and are anodic to a steel raceway 60. Other combinations of materials encompassed by the present invention can be ascertained through reference to a galvanic series table, such as ASTM G82-98, incorporated herein by reference.

Figure 3:
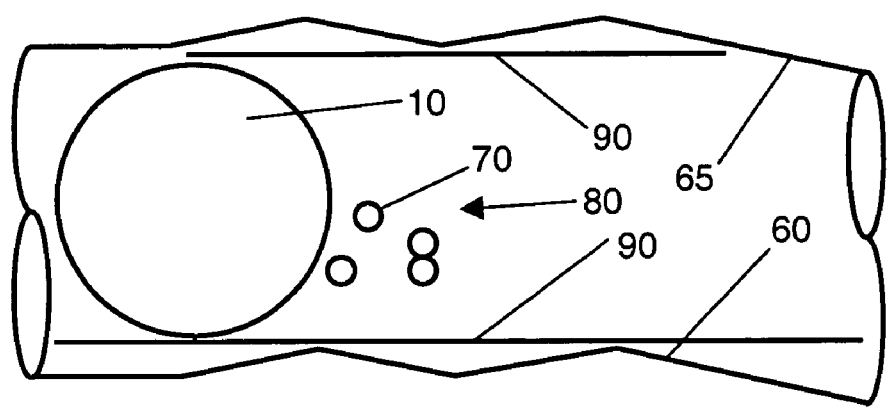
FIG. 3 is a magnified side view of a section of a bearing element with a roller element, suspended anodic metal or metal alloy nanoparticles, and raceways with a coating of anodic metal or metal alloy nanoparticle film.

FIG. 3 depicts a magnified side view of bearing element 50 with an anodic metal or metal alloy nanoparticle film 90 on at least a portion of the raceways 60 and 65. As contemplated by the present invention, the movement of roller elements 10 on raceways 60 and 65 acts on the nanoparticles 70 to form a film 90 on at least a portion of the raceways 60 or 65. It should be evident that nanoparticle film 90 may gradually form as the movement of the roller elements 10 on raceways 60 and 65 continues to act on nanoparticles 70. In addition, a layer or multiple layers of nanoparticle film 90 may be formed simply by applying an oil or grease that contains nanoparticles 70 to the raceways 60 or 65. An oil or grease with nanoparticles 70 can be applied by spraying, coating, or other methods. In any event, nanoparticle film 90 forms a coating on at least a portion of the raceways 60 or 65 and protects raceways 60 or 65 from the environment and prevents the coated portions of raceways 60 or 65 from contacting corrosive environmental conditions.

The nanoparticle film 90 is comprised of anodic metal or metal alloy nanoparticles 70. Because the nanoparticle film 90 is anodic relative to the material comprising the outer surface of the raceways 60 and 65, the anodic nanoparticle film 90 will have a tendency to corrode relative to the material comprising the outer surface of the raceways 60 and 65. In addition, because the nanoparticle film 90 is anodic relative to the material comprising the outer surface of the raceways 60 and 65, it is not necessary, for corrosion protection, for the nanoparticle film 90 to form a continuous surface over the entire material comprising the outer surface of the raceways 60 and 65. Breaks, chips, or discontinuities in the nanoparticle film 90 will not cause the material comprising the outer surface of the raceways 60 or 65 to corrode. Instead, the nanoparticle film 90, as opposed to the raceways 60 and 65, will still have a tendency to corrode, even if breaks or discontinuities are present.

In addition, the present invention is advantageous because a corroded nanoparticle film 90 can easily be replaced. The present invention is particularly suited for bearings that are in operation. Additional lubricant 80 containing nanoparticles 70 may be added to a bearing as needed or as part of a regular maintenance schedule. The movement of roller elements 10 on raceways 60 and 65 will continue to act on the nanoparticles 70 to form a nanoparticle film 90 on the raceways 60 and 65 or on any existing layers of nanoparticle film 90. As the nanoparticle film 90 forms, corroded portions of the anodic metal or metal alloy nanoparticle film 90 will be replaced.

Figure 4:
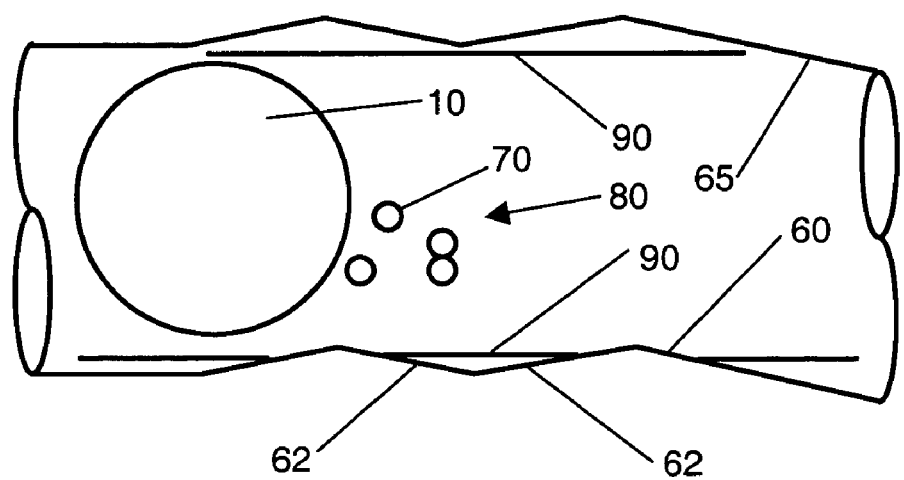
FIG. 4 is a magnified side view of a section of a bearing element with a roller element, suspended anodic metal or metal alloy nanoparticles, and raceways with a coating of anodic metal or metal alloy nanoparticle film filling in some of the pits and imperfections on the raceways.

Another advantage of the present invention is that it improves the anti-wear and anti-friction characteristics of the roller elements 10 and the raceways 60 and 65. On the portions of the raceways 60 and 65 where the nanoparticle film 90 is present, the nanoparticle film 90 prevents a roller element 10 from directly contacting the raceways 60 and 65. In many applications, especially when the raceways 60 and 65 comprise hardened steel, the nanoparticle film 90 will also be a softer surface on which a roller element 10 will act. As shown in FIG. 3 and more particularly in FIG. 4, the nanoparticles 70, and hence the nanoparticle film 90, also fill the pits 62 and other imperfections in the surface of raceways 60 and 65, thereby smoothing the surfaces of raceways 60 and 65. As a result of the improved anti-wear and anti-friction characteristics of roller elements 10 and raceways 60 and 65, the present invention improves the fatigue life of bearing element 50.

To lengthen fatigue life, a thickness of the anodic metal or metal alloy nanoparticle film is approximately 0.0002 inches, although other thicknesses such as those ranging from 0.00002 to 0.0025 inches, are possible as well. A discussion of soft coatings can be found in the book, STLE Life Factors for Rolling Bearings, written by Zaretsky, and incorporated herein by reference. In addition, to maximize anti-wear and anti-friction properties of the raceway, a nanoparticle film 90 completely covering the raceway 60 is ideal. Fatigue life will improve, however, even if the nanoparticle film 90 does not completely cover the raceways 60 or 65.

Figure 5:
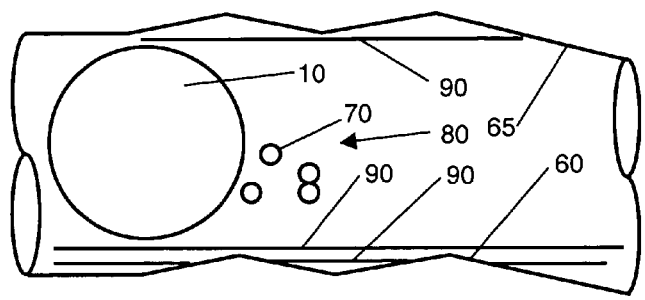
FIG. 5 is a magnified side view of a section of a bearing element with a roller element, suspended anodic metal or metal alloy nanoparticles, and raceways with portions of the raceways covered with multiple layers of anodic metal or metal alloy nanoparticle film.

FIG. 5 depicts a magnified side view of bearing element 50. The anodic metal or metal alloy nanoparticle film 90 may be formed both on portions of the raceways 60 or 65 as well as on portions of the anodic metal or metal alloy nanoparticle film 90 surface. Further, multiple layers of anodic metal or metal alloy nanoparticle film 90 may thus form as additional lubricant 80 containing suspended anodic metal or metal alloy nanoparticles 70 is added to the bearing 50, during, for example, maintenance or re-greasing. It should also be evident that a gradual addition of lubricant 80 containing suspended anodic metal or metal alloy nanoparticles 70 will lead to a more gradual build-up of nanoparticle film 90 and further, additional layers of nanoparticle film 90.

Figure 6:
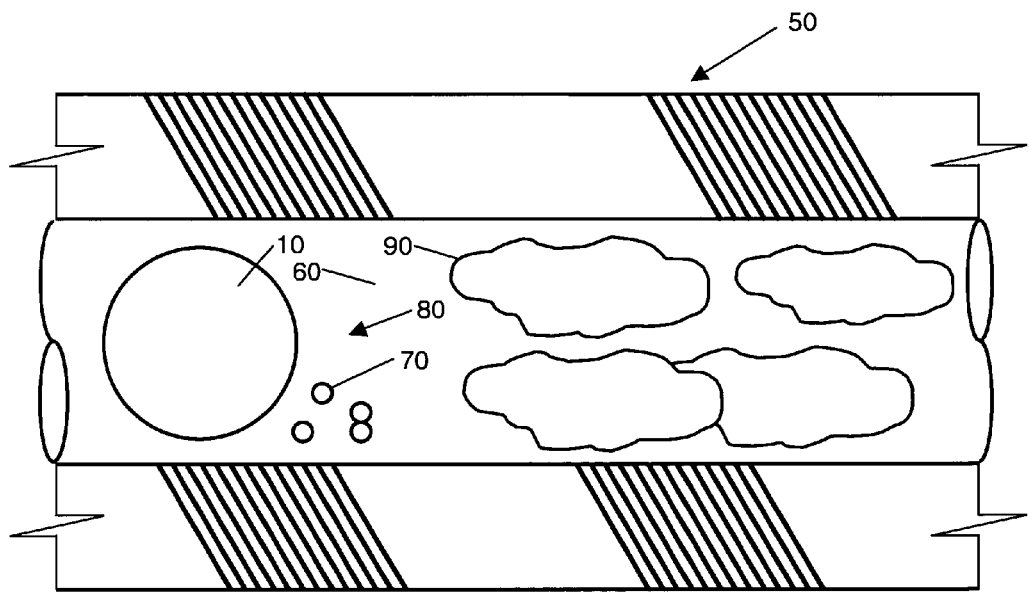
FIG. 6 is a magnified top view of a section of a bearing element with a roller element, suspended anodic metal or metal alloy nanoparticles, and a raceway with portions of the raceway covered with an anodic metal or metal alloy nanoparticle film.

FIG. 6 depicts a magnified top view of bearing element 50 with a roller element 10 positioned over inner raceway 60 with suspended nanoparticles 70. As can be seen in this figure, the anodic metal or metal alloy nanoparticle film 90 forms on portions of the raceway 60. Ideally, the entire raceways 60 and 65 will be covered with a coating of anodic nanoparticle film 90. However, as shown in FIG. 6, even partial coverage of the raceways 60 or 65 will provide anodic protection as well as provide antiwear and Antifriction benefits to the raceway.

While certain features and embodiments of the invention have been described herein, it will be readily understood that the invention encompasses all modifications and enhancements within the scope and spirit of the present invention.

I claim:

1. A bearing comprising:
    a first ring having a first raceway constructed from a first metal or metal alloy;
    a second ring having a second raceway constructed from a second metal or metal alloy;
    a plurality of roller elements positioned between the first raceway and the second raceway; and
    a lubricant disposed between the first raceway and the second raceway, the lubricant containing a plurality of suspended nanoparticles;
    wherein the suspended nanoparticles are comprised of a third metal or metal alloy that is more anodic than the first metal or metal alloy.

2. The bearing of claim 1, wherein the third metal or metal alloy is more anodic than the second metal or metal alloy.

3. The bearing of claim 1, further comprising:
a first layer of a nanoparticle film disposed on at least a portion of the first raceway, the nanoparticle film is comprised of the suspended nanoparticles.

4. The bearing of claim 1, wherein the nanoparticles comprise zinc or zinc alloy.

5. The bearing of claim 4, wherein an average diameter of the suspended nanoparticles is approximately 10 nanometers.

6. The bearing of claim 4, wherein a diameter of the suspended nanoparticles is between approximately 10 nanometers and a maximum diameter entrainable between the roller and raceway.

7. The bearing of claim 6, wherein the maximum diameter entrainable between the roller and raceway is governed by the equation $$R_{max} = \{[(r_i+R)^2 + 4\mu^2 R r_i]^{1/2} - (r_i+R)\}/2,$$

where $R_{max}$ denotes the radius of the largest particle that the can be entrained.

8. The bearing of claim 4, wherein a concentration of the suspended nanoparticles in the lubricant is from about 0.2 percent to about 0.5 percent by weight.

9. The bearing of claim 4, wherein a concentration of the suspended nanoparticles in the lubricant is from about 0.2 percent to about 2.0 percent by weight.

10. The bearing of claim 4, wherein a concentration of the suspended nanoparticles in the lubricant is from about 2.0 percent to about 7.0 percent by weight.

11. A bearing comprising:
a first ring having a first raceway constructed from a first metal or metal alloy;
a second ring having a second raceway constructed from a second metal or metal alloy;
a plurality of roller elements positioned between the first raceway and the second raceway;
a first layer of a nanoparticle film disposed on at least a portion of the first raceway, wherein the nanoparticle film is comprised of a plurality of metal or metal alloy nanoparticles that are more anodic than the first metal or metal alloy.

12. The bearing of claim 11, wherein the nanoparticles comprise zinc or zinc alloy.

13. The bearing of claim 12, wherein an average diameter of the nanoparticles is approximately 10 nanometers.

14. The bearing of claim 12, wherein a diameter of the nanoparticles is between approximately 10 nanometers and a maximum diameter entrainable between the roller and raceway.

15. The bearing of claim 14, wherein the maximum diameter entrainable between the roller and raceway is governed by the equation $$R_{max} = \{[(r_i+R)^2 + 4\mu^2 R r_i]^{1/2} - (r_i+R)\}/2,$$

where $R_{max}$ denotes the radius of the largest particle that the can be entrained.

16. The bearing of claim 12, wherein the nanoparticle film is approximately 0.0002 inches thick.

17. The bearing of claim 12, wherein the nanoparticle film contains a concentration of nanoparticles from about 0.2 percent to about 2.0 percent by weight.

18. The bearing of claim 12, wherein the nanoparticle film is from about 0.00002 inches to about 0.0025 inches thick.

19. The bearing of claim 11, wherein the nanoparticle film covers the entire first raceway.

20. The bearing of claim 11, further comprising a second layer of a nanoparticle film disposed on at least a portion of the second raceway, wherein the nanoparticle film is comprised of a plurality of metal or metal alloy nanoparticles that are more anodic than the second metal or metal alloy.

21. The bearing of claim 20, wherein the nanoparticle film covers the entire second raceway.

22. A bearing comprising:
a first ring having a first raceway having a first outer surface, the first raceway being constructed from a first metal or metal alloy;
a second ring having a second raceway having a second outer surface, the second raceway being constructed from a second metal or metal alloy;
a plurality of roller elements positioned between the first raceway and the second raceway; and
a lubricant disposed between the first raceway and the second raceway containing a plurality of suspended nanoparticles;
wherein the suspended nanoparticles are comprised of a third metal or metal alloy that is more anodic than the first metal or metal alloy; and
wherein the suspended nanoparticles fill at least some imperfections or pits in the first outer surface.

23. The bearing of claim 22, wherein the third metal or metal alloy is more anodic than the second metal or metal alloy.

24. The bearing of claim 22, wherein the suspended nanoparticles fill a majority of the imperfections or pits in the first outer surface.

25. The bearing of claim 22, wherein the suspended nanoparticles fill at least some imperfections or pits in the second outer surface.

26. The bearing of claim 25, wherein the suspended nanoparticles fill a majority of the imperfections or pits in the second outer surface.

27. A method of lubricating a bearing, wherein the bearing comprises a first ring having a first raceway constructed of a first metal or metal alloy and a second ring having a second raceway constructed of a second metal or metal alloy, the first raceway and the second raceway forming a channel therebetween, comprising the steps of:
disposing within the channel a lubricant containing a plurality of suspended nanoparticles; and
forming a first nanoparticle film on at least a portion of the first raceway, the first nanoparticle film being formed from the suspended nanoparticles;
wherein the suspended nanoparticles and the first nanoparticle film are comprised of a third metal or metal alloy that is more anodic than the first metal or metal alloy.

28. The bearing of claim 27, wherein the first nanoparticle film is formed by moving the roller elements over the first raceway.

29. The method of claim 27, further comprising:
forming a second nanoparticle film on at least a portion of the second raceway, the second nanoparticle film being formed from the suspended nanoparticles;
wherein the third metal or metal alloy is more anodic than the second metal or metal alloy.

30. The bearing of claim 29, wherein the second nanoparticle film is formed by moving the roller elements over the second raceway.

31. The bearing of claim 27, wherein the nanoparticles comprise zinc or zinc alloy.

32. The bearing of claim 31, wherein an average diameter of the suspended nanoparticles is approximately 10 nanometers.

33. The bearing of claim 31, wherein a diameter of the suspended nanoparticles is between approximately 10 nanometers and a maximum diameter entrainable between the roller and raceway.

34. The bearing of claim 33, wherein the maximum diameter entrainable between the roller and raceway is governed by the equation $$R_{max}=\{[(r_i+R)^2+4\mu^2 R r_i]^{1/2}-(r_i+R)\}/2,$$

where $R_{max}$ denotes the radius of the largest particle that the can be entrained.

35. The bearing of claim 31, wherein the nanoparticle film is approximately 0.0002 inches thick.

36. The bearing of claim 31, wherein the lubricant contains a concentration of nanoparticles from about 0.2 percent to about 2.0 percent by weight.

37. The bearing of claim 31, wherein the nanoparticle film is from about 0.00002 inches to about 0.0025 inches thick.

38. The bearing of claim 31, wherein a concentration of the suspended nanoparticles in the lubricant is from about 0.2 percent to about 0.5 percent by weight.

39. The bearing of claim 31, wherein a concentration of the suspended nanoparticles in the lubricant is from about 0.2 to about 1.0 percent by weight.

40. The bearing of claim 31, wherein a concentration of the suspended nanoparticles in the lubricant is from about 2.0 percent to about 7.0 percent by weight.

41. The method of claim 27, further comprising:
disposing within the channel additional lubricant containing a plurality of suspended nanoparticles; and
forming a further first nanoparticle film on at least a portion of the first raceway, the further first nanoparticle film being formed from the suspended nanoparticles;
wherein the further first nanoparticle film is comprised of the third metal or metal alloy.

42. The bearing of claim 41, wherein the further first nanoparticle film is formed by moving the roller elements over the first raceway.

43. The method of claim 41, further comprising:
forming a further second nanoparticle film on at least a portion of the second raceway, the further second nanoparticle film being formed from the suspended nanoparticles;
wherein the further second nanoparticle film is comprised of the third metal or metal alloy.

44. The bearing of claim 43, wherein the further second nanoparticle film is formed by moving the roller elements over the second raceway.

45. A device comprising:
a first component constructed from a first metal or metal alloy;
a second component constructed from a second metal or metal alloy, wherein the second component is in sliding or rolling contact with an area of the first component; and
a first layer of a nanoparticle film disposed on at least a portion of the area of the first component, wherein the nanoparticle film is comprised of a plurality of metal or metal alloy nanoparticles that are more anodic than the first metal or metal alloy.

46. The device of claim 45, wherein the nanoparticles comprise zinc or zinc alloy.

47. The device of claim 46, wherein the nanoparticle film is approximately 0.0002 inches thick.

48. The device of claim 46, wherein the nanoparticle film is from about 0.00002 to about 0.0025 inches thick.

49. The device of claim 46, wherein the nanoparticle film contains a concentration of nanoparticles from about 0.2 percent to about 2.0 percent by weight.

* * * * *